(12) United States Patent
Germaine et al.

(10) Patent No.: US 12,668,087 B2
(45) Date of Patent: Jun. 30, 2026

(54) TRAILER CAMERA COMMUNICATIONS SYSTEM

(71) Applicant: STONERIDGE ELECTRONICS AB, Solna (SE)

(72) Inventors: John S. Germaine, Traverse City, MI (US); Dominik Marx, Novi, MI (US); Darren Schumacher, Ann Arbor, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 183 days.

(21) Appl. No.: 18/673,415

(22) Filed: May 24, 2024

(65) Prior Publication Data

US 2024/0308285 A1 Sep. 19, 2024

Related U.S. Application Data

(63) Continuation of application No. 18/282,349, filed as application No. PCT/US2022/034710 on Jun. 23, 2022, now Pat. No. 11,993,113.

(Continued)

(51) Int. Cl.
*B60D 1/62* (2006.01)
*B60R 1/22* (2022.01)
(Continued)

(52) U.S. Cl.
CPC .................. *B60D 1/62* (2013.01); *B60R 1/22* (2022.01); *H04N 23/81* (2023.01);
(Continued)

(58) Field of Classification Search
CPC ....... B60D 1/62; B60R 1/22; B60R 2300/105; B60R 2300/802; B60R 16/023; H04N 23/81; H04N 25/617
See application file for complete search history.

(56) References Cited

U.S. PATENT DOCUMENTS 6,254,201 B1  7/2001  Lesesky et al.
6,909,363 B2  6/2005  Bell et al.
(Continued)

FOREIGN PATENT DOCUMENTS

WO  2022271940 A1  12/2022

OTHER PUBLICATIONS

International Search Report and Written Opinion for International Application No. PCT/EP2024/088075 mailed Apr. 23, 2025.
(Continued)

*Primary Examiner* — Valentin Neacsu
*Assistant Examiner* — Marlon A Arce
(74) *Attorney, Agent, or Firm* — Carlson, Gaskey & Olds, P.C.

(57) ABSTRACT

A first processor is connected to a first filter on a tractor and receives at least one control signal from at least one vehicle control. The first processor communicates the control signal to the trailer component. A second processor is connected to a second filter on a trailer. The second filter is interconnected between the second processor and the trailer component. A sensor on the trailer is connected to the second processor and generates a sensor signal. A wiring harness communicates with the first filter and the vehicle control on the tractor and with the second filter and the trailer component. The wiring harness has common wires that carry the control signal from the first filter to the trailer component via the second filter. The common wires carry the sensor signal transformed by the second processor from the second filter to the first processor via the first filter.

13 Claims, 5 Drawing Sheets

Related U.S. Application Data

(60) Provisional application No. 63/213,938, filed on Jun. 23, 2021.

(51) Int. Cl.
  *H04N 23/81* (2023.01)
  *H04N 25/617* (2023.01)

(52) U.S. Cl.
  CPC ...... *H04N 25/617* (2023.01); *B60R 2300/105* (2013.01); *B60R 2300/802* (2013.01)

(56) References Cited

U.S. PATENT DOCUMENTS

| | | | |
|---|---|---|---|
| 6,967,414 | B1 | 11/2005 | Wedding et al. |
| 6,970,772 | B2 | 11/2005 | Radtke et al. |
| 7,574,287 | B2 | 8/2009 | Lang et al. |
| 9,434,308 | B2 | 9/2016 | Bean |
| 9,499,109 | B2 | 11/2016 | Armacost et al. |
| 10,854,023 | B1 | 12/2020 | Trinh et al. |
| 10,858,053 | B2 | 12/2020 | Bean et al. |
| 11,479,069 | B2 | 10/2022 | Pampattiwar et al. |
| 11,618,291 | B2 | 4/2023 | Balton et al. |
| 11,697,314 | B2 * | 7/2023 | Slade ...................... B60D 1/62 439/35 |
| 11,993,113 | B2 * | 5/2024 | Germaine ................ B60D 1/62 |
| 12,360,148 | B2 * | 7/2025 | Ruiz .................... G01R 31/007 |
| 2017/0240125 | A1 | 8/2017 | Weigert et al. |
| 2018/0033284 | A1 * | 2/2018 | Greenwald .............. H04Q 9/02 |
| 2018/0372875 | A1 | 12/2018 | Juelsgaard et al. |
| 2019/0084534 | A1 | 3/2019 | Kasper et al. |
| 2019/0217831 | A1 * | 7/2019 | Viele ...................... B60D 1/245 |
| 2020/0171901 | A1 | 6/2020 | Pampattiwar et al. |
| 2020/0338941 | A1 | 10/2020 | Slade et al. |
| 2020/0361384 | A1 | 11/2020 | Larsson et al. |
| 2021/0162922 | A1 | 6/2021 | Camarero et al. |
| 2021/0229510 | A1 | 7/2021 | Balton et al. |
| 2021/0281030 | A1 | 9/2021 | Hahn et al. |
| 2021/0309194 | A1 | 10/2021 | Thomas et al. |
| 2022/0126637 | A1 | 4/2022 | Kahlbaum et al. |
| 2023/0242038 | A1 | 8/2023 | Peterson |

OTHER PUBLICATIONS

International Search Report and Written Opinion for International Application No. PCT/US2024/036868 mailed Oct. 1, 2024.
Wissing et al., "Development, Evaluation, and Demonstration of a Tractor Trailer Intelligent Communication -and Power Link," U.S. Department of Transportation Federal Highway Administration and National Highway Traffic Safety Administration, Jan. 1998.
International Preliminary Report on Patentability for International Application No. PCT/US2022/034710 mailed Jun. 5, 2023.
International Search Report and Written Opinion for International Application No. PCT/US2022/034710 mailed Oct. 27, 2022.
Extended European Search Report for European Application No. 24185169.0 mailed Sep. 30, 2024.
Japanese Office Action for Japanese Application No. 2023-578946 mailed Mar. 17, 2026.

* cited by examiner

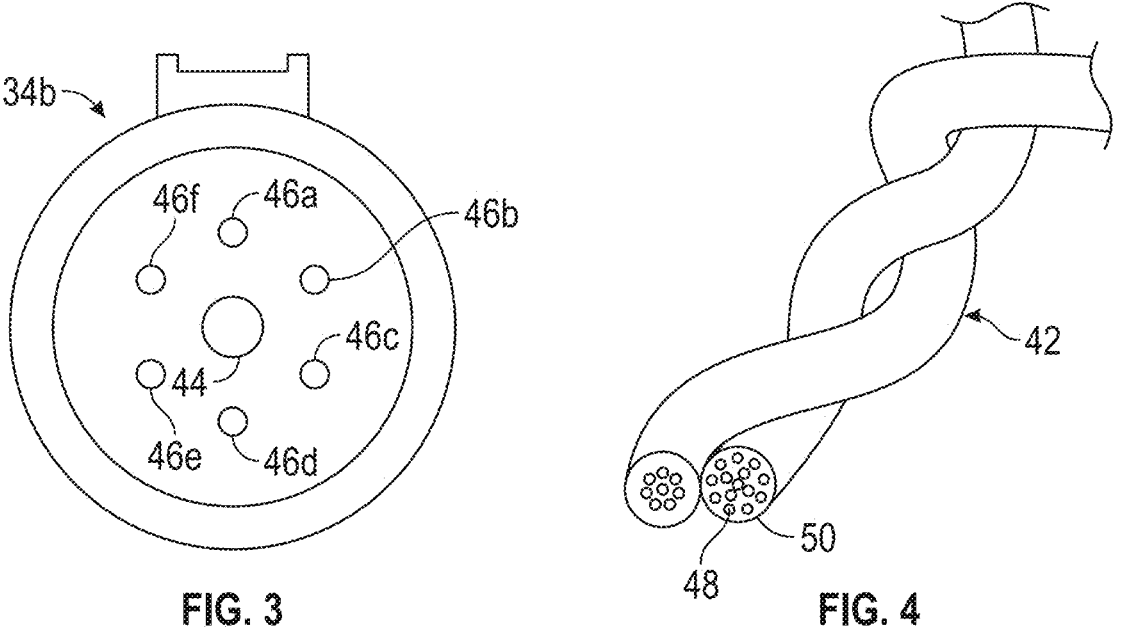
FIG. 3
FIG. 4
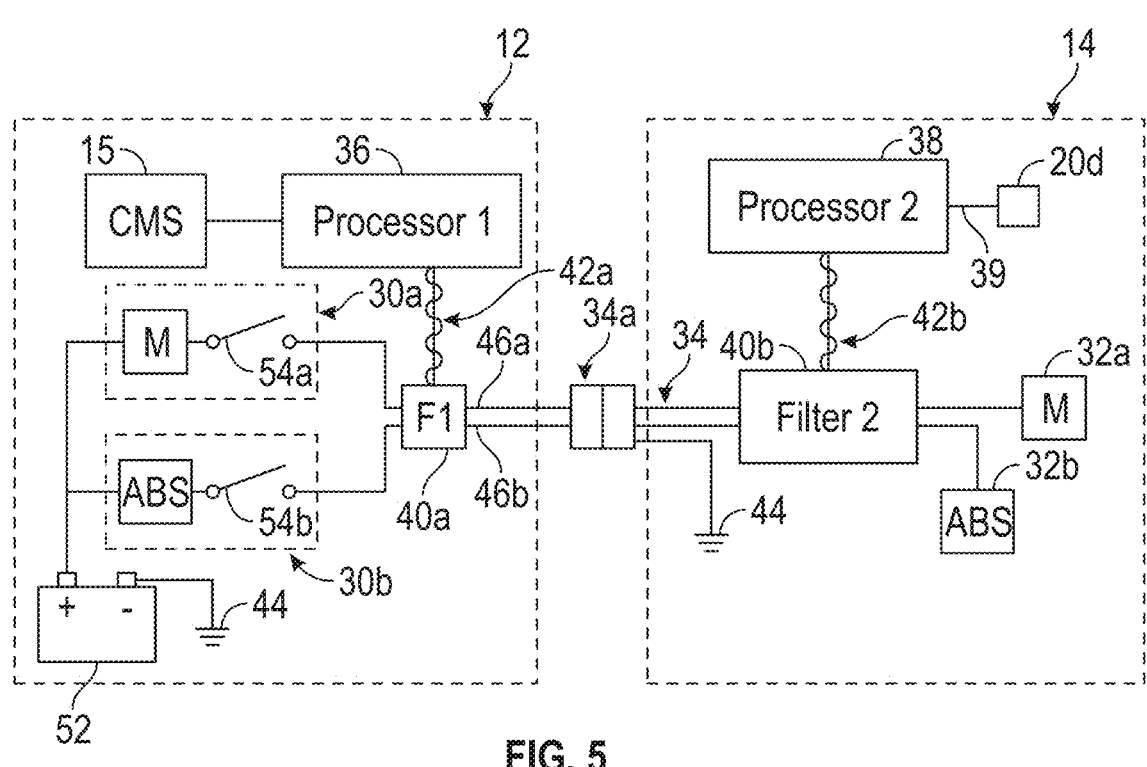
FIG. 5

TRAILER CAMERA COMMUNICATIONS SYSTEM

CROSS-REFERENCE TO RELATED APPLICATION

This application is a Continuation of U.S. patent application Ser. No. 18/282,349 filed Sep. 15, 2023, which is a U.S. National Phase of International Application No. PCT/US2022/034710 filed Jun. 23, 2022, which claims priority to U.S. Provisional Application No. 63/213,938 filed on Jun. 23, 2021.

TECHNICAL FIELD

This disclosure relates to a camera monitoring system (CMS) for use in a commercial truck, and in particular to a system for providing communications between a sensor, such as a trailer-mounted camera, and the CMS.

BACKGROUND

Mirror replacement systems, and camera systems for supplementing mirror views, are utilized in commercial vehicles to enhance the ability of a vehicle operator to see a surrounding environment. Camera monitoring systems (CMS) utilize one or more cameras to provide an enhanced field of view to a vehicle operator. In some examples, the mirror replacement systems cover a larger field of view than a conventional mirror, or include views that are not fully obtainable via a conventional mirror.

The area behind the trailer is a typical blind spot in a conventional mirror system. It is desirable to provide the operator visibility at the rear of the trailer.

SUMMARY

In one exemplary embodiment, a camera monitoring system for a vehicle including a tractor and trailer includes a trailer that has trailer components that are responsive to at least one control signal and a wiring harness that is in communication with the trailer components and has a connector that is configured to communicate with a tractor. The wiring harness is configured to carry the at least one control signal to the trailer components. The system further includes a sensor that is provided on the trailer and is configured to generate a sensor signal. The system further includes a processor that is interconnected between the sensor and the wiring harness. The processor is configured to transform the sensor signal for transmission over the wiring harness with the at least one control signal using common wires within the wiring harness. The system further includes a filter that is interconnected between the processor and at least one of the trailer components and is configured to filter noise from the at least one control signal.

In a further embodiment of any of the above, the trailer components include at least one of a marker light, a brake light, a tail light, a turn signal, and an anti-lock braking system component. Each of the trailer components are configured to receive one of the at least one control signal.

In a further embodiment of any of the above, the noise is generated by the trailer components.

In a further embodiment of any of the above, the common wires are provided by unshielded wires. The common wires carry the at least one control signal and the sensor signal.

In a further embodiment of any of the above, the common wires include a power wire for one of the trailer components and a ground wire in the wiring harness. The at least one control signal and the sensor signal are configured to be transmitted over the common wires.

In a further embodiment of any of the above, a chipset includes the processor and an encoder. The encoder is configured to embed the sensor signal into the at least one control signal.

In a further embodiment of any of the above, the system includes additional electrical devices. The sensor and the additional electrical devices are connected to multiple inputs of the processor. The chipset includes a multiplexer that is configured to combine the multiple inputs to provide the sensor signal as an output of the sensor and electrical devices.

In a further embodiment of any of the above, the processor includes an input. The sensor is connected to the input by an ethernet cable.

In a further embodiment of any of the above, the sensor is at least one of a camera, a radar, a lidar, an infrared sensor and an ultrasonic sensor.

In a further embodiment of any of the above, the sensor is a camera, and the sensor signal is transmitted by the processor over the common wires at a speed of at least 15 Mb/s.

In a further embodiment of any of the above, the system includes a camera mirror system for a vehicle that includes a tractor having a vehicle cab, a camera system mounted to the tractor and has fields of view of at least one of Class II and Class IV views, at least one display that is arranged in the vehicle cab and is in communication with the camera system and is configured to display the fields of view, and a controller that is in communication with the camera system and the at least one display. The sensor signal is configured to be transmitted to the controller.

In a further embodiment of any of the above, the sensor is a camera that is configured to provide the sensor signal to the at least one display.

In a further embodiment of any of the above, the sensor signal is an uncompressed signal with a latency of less than 200 ms.

In a further embodiment of any of the above, the processor is a second processor and the filter is a second filter. The tractor has a first processor that is connected to a first filter by unshield twisted pair of wires. The first filter is connected to the common wires. The first processor is configured to receive the sensor signal via the first filter and transmit the sensor signal to controller.

In a further embodiment of any of the above, the first processor includes a decoder and a demultiplexer that is configured to isolate the sensor signal from the at least one control signal.

In a further embodiment of any of the above, the decoder is provided by at least one of hardware and software.

In a further embodiment of any of the above, at least one of the first and second processers are configured to perform pulse amplitude modulation to reduce noise in the control signal over the common wires.

In a further embodiment of any of the above, one of the trailer components is a light housing that includes at least one of a marker light, a tail light, a brake light and a turn signal. The sensor is provided in the light housing.

In a further embodiment of any of the above, one of the trailer components is a light housing and includes at least one of a marker light, a tail light, a brake light and a turn signal. An array of IR LEDs are provided in the light housing, and the sensor is a camera.

In a further embodiment of any of the above, the camera is provided in the light housing.

BRIEF DESCRIPTION OF THE DRAWINGS

The disclosure can be further understood by reference to the following detailed description when considered in connection with the accompanying drawings wherein:

FIG. 3 is an end view of a trailer wiring harness connector.

FIG. 4 depicts an unshielded twisted wire pair used to connect a processor and a filter in a trailer wiring harness.

FIG. 5 is a schematic of an example implementation of the trailer camera communications system.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
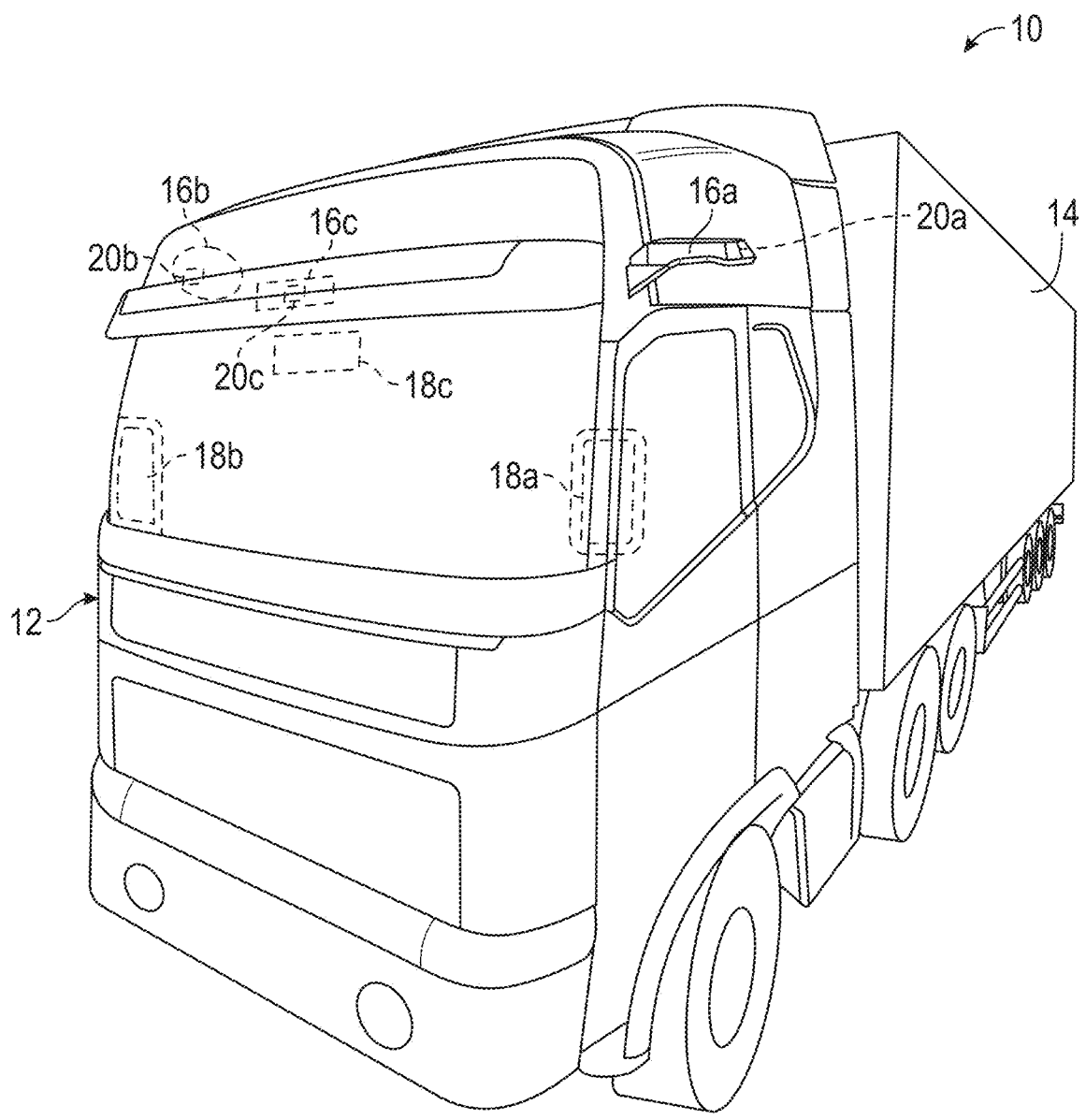
FIG. 1A is a schematic front view of a commercial truck with a camera monitoring system (CMS) used to provide at least Class II and Class IV views.
Figure 1B:
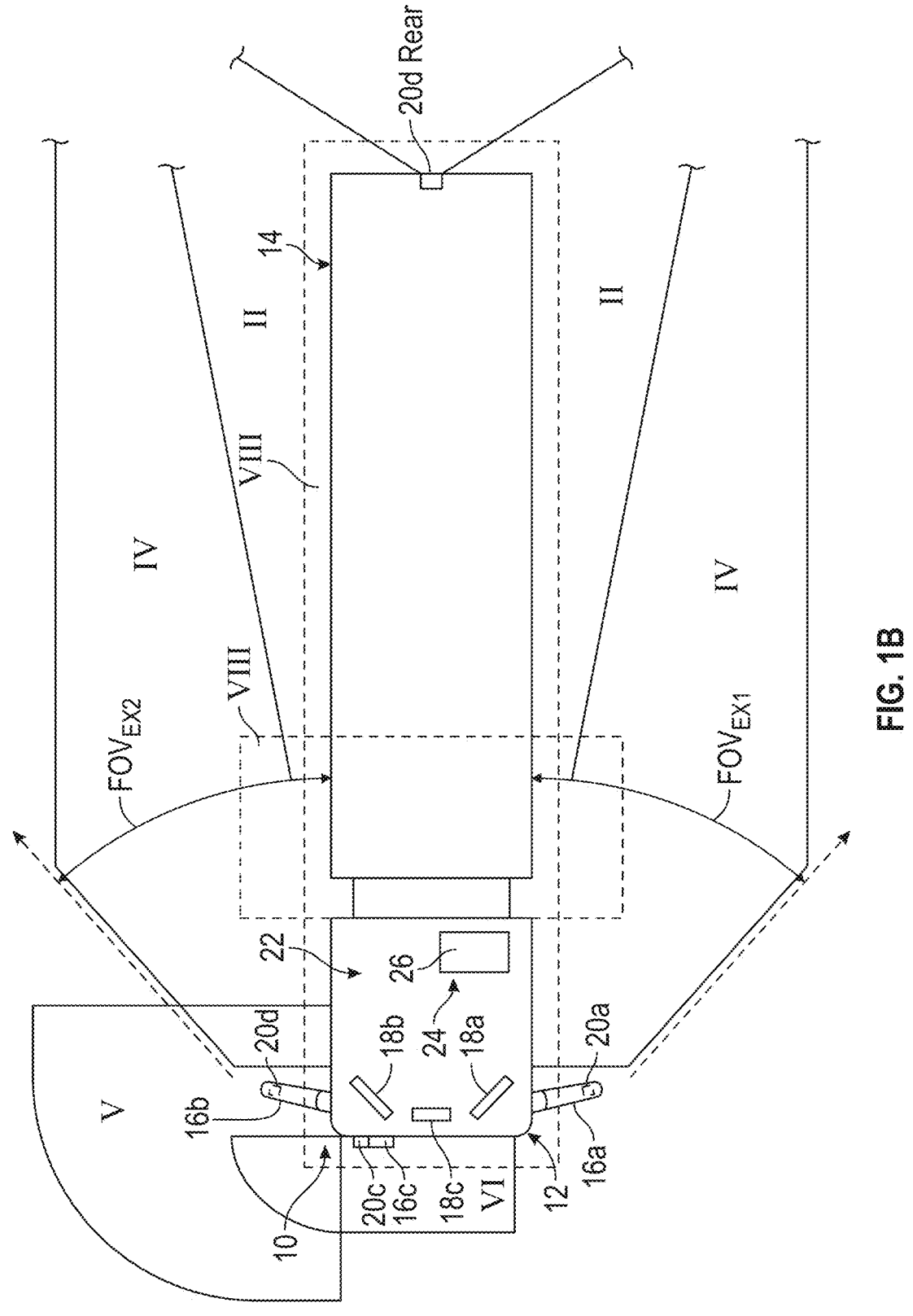
FIG. 1B is a schematic top elevational view of a commercial truck with a camera mirror system providing Class II, Class IV, Class V and Class VI views.

A schematic view of a commercial vehicle 10 is illustrated in FIGS. 1A and 1B. The vehicle 10 includes a vehicle cab or tractor 12 for pulling a trailer 14. Although a commercial truck is contemplated in this disclosure, the disclosed system may also be applied to other types of vehicles. The vehicle 10 incorporates a camera monitoring system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms 16, with each arm 16 housing one or more cameras and/or mirrors.

Each of the camera arms 16a, 16b includes a base that is secured to, for example, the cab 12. A pivoting arm is supported by the base and may articulate relative thereto. At least one rearward facing camera 20a, 20b is arranged respectively within the camera arms 16a, 16b, e.g., the pivoting arms. The exterior cameras 20a, 20b respectively provide an exterior field of view $FOV_{EX1}$, $FOV_{EX2}$ that each include at least one of the Class II and Class IV views (FIG. 1B) or similar views, which are legal prescribed views in the commercial trucking industry. The Class II view on a given side of the vehicle 10 is a subset of the Class IV view of the same side of the vehicle 10. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

If video of Class VIII views is desired, camera housings can be disposed at the sides and rear of the vehicle 10 to provide fields of view including some or all of the Class VIII zones of the vehicle 10. In such examples, the third display 18c can include one or more frames displaying the Class VIII views. Alternatively, additional displays can be added near the first, second and third displays 18a, 18b, 18c and provide a display dedicated to providing a Class VIII view.

It should be understood that more or fewer displays can be used than schematically illustrated, and the displayed images from more than one camera may be combined on a single display, or an image from a particular field of view may be provided on a separate, discrete display from another image.

The area behind the trailer 14 is a common blind spot for any vehicle, but particularly for commercial trucks. So, it is desirable to provide the operator some awareness of unseen objects at the rear of the trailer using a sensor, such as a camera 20d, as illustrated in FIG. 1B. Challenges to using a camera at the rear of a trailer 14 is the long run of wires that might be used to transmit a video signal to the display in the cab. Dedicated wiring would add significant cost to the system. Additionally, the images must be transmitted with minimal to no latency so objects are displayed in real time.

Figure 2:
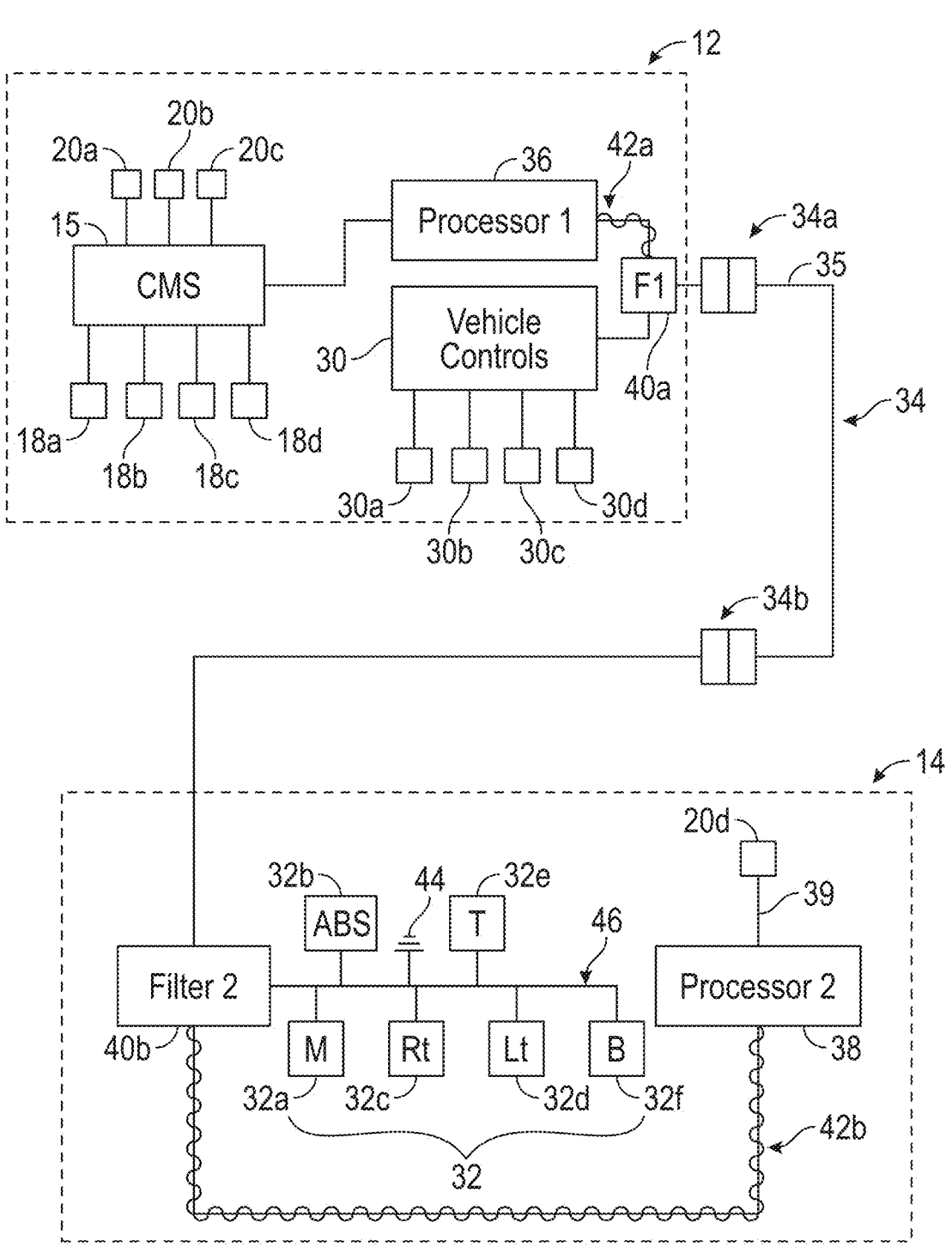
FIG. 2 is a schematic of a trailer camera communications system.

Referring to FIG. 2, the trailer 14 includes trailer components 32, such as a marker light 32a, an anti-lock braking system component 32b, a turn signal (right, 32c; left, 32d), a tail light 32e, and a brake light 32f. Each of the trailer components 32a-32f (collectively, trailer components 32) are responsive to a control signal from one or more vehicle controls 30, e.g., switches 30a-30d. The trailer components 32 on the trailer 14 are connected to the tractor 12 by a typical wiring harness 34. As an example, a standard 7-pin jumper cable 35 interconnects the tractor 12 and trailer 14 at connectors 34a, 34b, which are of a typical configuration (e.g., FIG. 3). As a result, the disclosed system can be used with the existing ubiquitous trailer wiring harnesses and electrical connectors in the industry.

There are various ground wires 44 in the system, only some of which are shown. Wires within a common wiring harness 34 are unshielded copper wire, typically multiple copper wire strands covered in a polymer insulation. For a standard 7-pin arrangement, shown in FIG. 3, a common ground 44 is provided, and control signals for the marker light 32a, the anti-lock braking system component 32b, the turn signal (right, 32c; left, 32d), the tail light 32e, and the brake light 32f are respectively sent over power wires 46a-46f.

The camera 20d has an image capture unit that generates a sensor signal that must be sent at a high transmission rate. The disclosed system accomplishes this transmission without the need for dedicated wiring running from the rear of the trailer 14 all the way to the tractor 12, which greatly simplifies installation and reduces cost. Desired sensor signal transmission is achieved over the very same power wires on the trailer 14 used to transmit control signals to the trailer components 32.

The tractor 12 has a first processor 36 that transmits the received sensor signal to the CMS 15 for display to the operator. A second processor 38 is arranged on the trailer 14 and interconnected between the sensor 20*d* and the wiring harness 34. The second processor 38 is configured to transform the sensor signal for transmission over the wiring harness 34 with the control signal using wires that are common with the wiring harness wires used to carry control signals to the trailer components 32. Said another way, several of the existing wires, e.g., a power wire and a ground wire, have a dual purpose: carrying a control signal and the sensor signal. An example chipset that may be used is available as VA6000 from Valens Semiconductor Ltd., although it should be understood that other processors can be used and fall within the scope of the disclosed system. Another example chipset is the DCB1M available from Yamar Electronics Ltd.

Noise is generated by the trailer components 32, such that a usable image signal may not be provided to the first and second processors 36, 38. So, first and second filters 40*a*, 40*b* are used at the signal tap locations, for example, respectively in the tractor and trailer wiring harness to filter out noise prior to transmission to the processors. Each of the filters 40*a*, 40*b* are connected to its respective first and second processor 36, 38 by an unshielded twisted pair of wires 42*a*, 42*b* (shown as "42" in FIG. 4). The twisted wire pairs are unshielded copper wire, typically multiple copper wire strands 48 covered in a polymer insulation 50, as shown in FIG. 4.

The second processor 38 includes an input, and the camera 20*d* is connected to the input by a high-speed transmission cable 39, such as an ethernet cable. The second processor 38 may be provided by a chipset that includes a processor and an encoder, which is configured to embed the sensor signal into the control signal for transmission along the power wire(s) to the first processor 36. Additional electrical devices may be connected to multiple inputs, if provided on the processor. The other inputs may accommodate, for example, IRLEDs associated with the camera 20*d*. The chipset may include a multiplexer configured to combine the inputs to provide the sensor signal as an output of the sensor along with outputs from the electrical devices.

The first processor 36 includes a decoder and a demultiplexer, which can be provided on the same chipset or separately, that are configured to isolate the sensor signal from the control signal. The decoder is provided by at least one of hardware and software.

At least one of the first and second processers 36, 38 are configured to perform pulse amplitude modulation to reduce noise in the control signal over the common power wires.

In operation, with reference to FIG. 5, the second processor 38 is configured to receive the sensor signal from the camera 20*d* and transmit the sensor signal to CMS controller 15. The second processor 38 embeds the sensor signal with the control signal on the power wires for the trailer components 32, such as over ABS and marker light power wires 46*a*, 48*b*. This combined sensor/control signal is transmitted along the trailer wiring harness 34 to the second filter 40*b* to filter any noise from the trailer components. Ideally, the second filter 40*b* is placed at a location and on power lines where the noise can be more easily filtered and to reduce the length of wires between the second filter 40 and the second processor 38.

The combined sensor/control signal is transmitted to the tractor 14 to a point "downstream" from vehicle component switches 54*a*, 54*b* to the first processor 36, where the sensor signal is decoded and transmitted to the CMS controller 15 for display. Each or both of the sensor signal and/or control signal may also be transmitted bi-directionally, if desired. The vehicle component switches 54*a*, 54*b* (e.g., trailer marker light switch and brake pedal) are connected to a power source 52, such as the vehicle's battery to selectively supply voltage, i.e., the control signal, to the trailer component. The first filter 40*a* must be located on the same pair of power transmission lines as the second filter 40*b*. The first filter 40 filters noise from the power wires to isolate the image signal sent from the second processor 38.

Although the sensor is described above as a camera 20*d*, it should be understood that other sensors may also be used in addition to or instead of a camera, such as a radar sensor, a lidar sensor, an infrared sensor and an ultrasonic sensor. In the case of a camera, it is desirable to transmit the sensor signal between the first and second processors 36, 38 and on to the CMS 15 over the common wires at a speed of at least 15 Mb/s. Compressing the sensor signal could result in undesired latency. The disclosed system is capable of achieving the desired transmission rate, without compression, with the minimal latency needed in a CMS system, i.e., less than 200 ms.

Figure 6A:
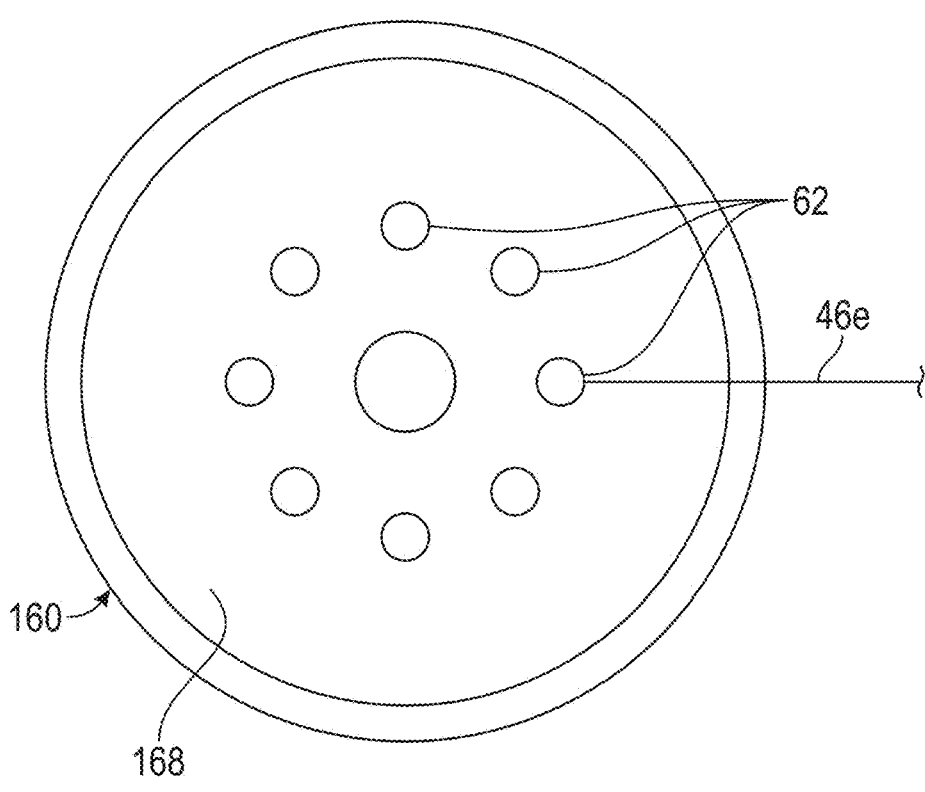
FIGS. 6A and 6B are examples of a sensor integrated into trailer light housings.
Figure 6B:
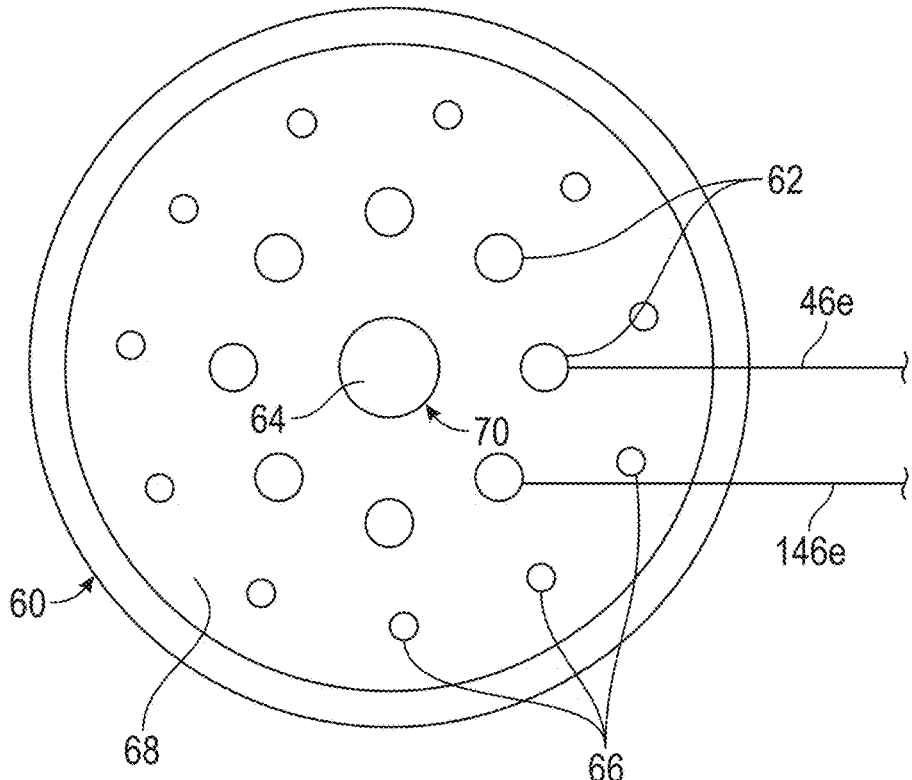

To provide further efficiencies, the sensor can be integrated into a light housing on the trailer 14, as shown in FIGS. 6A and 6B. Referring to FIG. 6B, a light housing 60 (e.g., a marker light, a tail light, a brake light and a turn signal) has the sensor 64, such as a camera 20*d*, provided in the housing 60. The lights 62 may be provided by LEDs 62 or incandescent bulbs for emitting visible light. An array of IR LEDs 66 powered by wires 146*e* may also be provided in the housing 66 if night vision is desired for the camera. The light housing 60 is sealed by a lens 68, which may cover the sensor as well. If desired, a separate lens 70 may be used over the sensor 64 and integrated with the lens 68, depending upon the application. The light housing 160 in FIG. 6A uses a lens 168 and with no IR LEDs.

Incorporating IR LEDs, and optionally a camera, into a ubiquitous taillight assembly would obviate the need for any specialized mounting brackets or hardware when adding night vision or another view at the rear of the trailer.

The controller in the CMS can be used to implement the various functionality disclosed in this application. The controller may include one or more discrete units. The first processor 36 can be incorporated into the CMS controller or separate, but the second processor 38 will be separate from the first processor 36 as the second processor resides on the trailer 14. Moreover, a portion of the controller may be provided in the vehicle, while another portion of the controller may be located elsewhere. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller may be a hardware device for executing software, particularly software stored in memory. The controller can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The disclosed input and output devices that may be coupled to system I/O interface(s) may include input devices, for example but not limited to, a keyboard, mouse, scanner, microphone, camera, mobile device, proximity device, etc. Further, the output devices, for example but not limited to, a display, macroclimate device, microclimate device, etc. Finally, the input and output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the controller is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A vehicle communications system including a tractor and a trailer, comprising:

a first processor connected to a first filter and configured to be provided on a tractor, the first filter is configured to receive at least one control signal from at least one vehicle control and communicate the at least one control signal to at least one trailer component;

a second processor connected to a second filter and configured to be provided on a trailer, the second filter interconnected between the second processor and the at least one trailer component;

a sensor connected to the second processor and configured to be provided on the trailer and to generate a sensor signal; and a wiring harness configured to be in communication with the first filter and the at least one vehicle control on the tractor and with the second filter and the at least one trailer component on the trailer, the wiring harness having common wires that are configured to carry the at least one control signal from the first filter to the at least one trailer component via the second filter, and the common wires configured to carry the sensor signal transformed by the second processor from the second filter to the first processor via the first filter.

2. The system of claim 1, wherein the at least one vehicle control includes multiple switches configured to be connected to multiple trailer components of the at least one trailer component, and the at least one trailer components include at least one of a marker light, a brake light, a tail light, a turn signal, and an anti-lock braking system component, each of the at least one trailer components configured to receive one of the at least one control signal.

3. The system of claim 2, wherein the wiring harness includes a 7-pin cable interconnecting the tractor and the trailer, wherein the at least one control signal and the sensor signal are configured to be communicated over the 7-pin cable, the 7-pin cable including the common wires which correspond to a pair of power transmission lines connected to one of the at least one trailer components.

4. The system of claim 3, wherein the sensor is at least one of a camera, a radar, a lidar, an infrared sensor and an ultrasonic sensor.

5. The system of claim 4, wherein the sensor is a camera, and the sensor signal is a video signal transmitted by the second processor over the common wires at a speed of at least 15 Mb/s.

6. The system of claim 1 wherein the second processor includes a chipset including at least one processor and an encoder, the encoder configured to embed the sensor signal into the at least one control signals.

7. The system of claim 6, comprising additional electrical devices, the sensor and the additional electrical devices connected to multiple inputs of the second processor, the chipset includes a multiplexer configured to combine the multiple inputs to provide the sensor signal as an output of the sensor and electrical devices.

8. The system of claim 1, wherein the first processor includes a decoder and a demultiplexer configured to isolate the sensor signal from the at least one control signal.

9. The system of claim 8, wherein the decoder is provided by at least one of hardware and software.

10. The system of claim 1, wherein at least one of the first and second processers are configured to perform pulse amplitude modulation to reduce noise in the control signal over the common wires.

11. The system of claim 1, wherein the common wires include a twisted pair of wires.

12. The system of claim 11, wherein the twisted pair of wires are unshielded wires.

13. The system of claim 1, comprising a camera mirror system for a vehicle including:

a camera system having multiple rear-facing fields of view;

multiple displays in communication with the camera system and configured to display the multiple rear-facing fields of view; and a controller in communication with the camera system and the multiple displays, the sensor signal configured to be transmitted to the controller, wherein the sensor is a camera configured to provide the sensor signal to at least one of the multiple displays, wherein the sensor signal is a signal with a latency of less than 200 ms.

\* \* \* \* \*